US012792645B2

(12) United States Patent
Calamvokis et al.

(10) Patent No.: US 12,792,645 B2
(45) Date of Patent: Nov. 10, 2026

(54) SYSTEMS AND METHODS FOR HETEROGENEOUS LARGE LANGUAGE MODEL PROMPT ATTENTION-PROCESSING

(71) Applicant: Expedera, Inc., Santa Clara, CA (US)

(72) Inventors: Costas Calamvokis, Bath (GB); Siyad Chih-Hua Ma, Palo Alto, CA (US); Sharad Vasantrao Chole, San Jose, CA (US); Shang-Tse Chuang, Taipei (TW)

(73) Assignee: Expedera, Inc., Santa Clara, CA (US)

( * ) Notice: Subject to any disclaimer, the term of this patent is extended or adjusted under 35 U.S.C. 154(b) by 0 days.

(21) Appl. No.: 19/174,305

(22) Filed: Apr. 9, 2025

(65) Prior Publication Data

US 2025/0328562 A1 Oct. 23, 2025

Related U.S. Application Data

(60) Provisional application No. 63/637,260, filed on Apr. 22, 2024.

(51) Int. Cl.

*G06F 16/3329* (2025.01)
*G06F 16/2455* (2019.01)
*G06F 40/284* (2020.01)

(52) U.S. Cl.

CPC .. *G06F 16/33295* (2025.01); *G06F 16/24552* (2019.01); *G06F 40/284* (2020.01)

(58) Field of Classification Search

CPC ......... G06F 16/33295; G06F 16/24552; G06F 40/284

See application file for complete search history.

(56) References Cited

U.S. PATENT DOCUMENTS 11,646,017 B1 * 5/2023 Shi ........................... G06N 3/08 704/232
12,431,131 B1 * 9/2025 Balasubramaniam ....................... G10L 15/197

(Continued)

OTHER PUBLICATIONS

Vaswani et al., "Attention is All You Need," 31st Conference on Neural Information Processing Systems (NIPS 2017), Jun. 12, 2017, 11 pages.

*Primary Examiner* — Khanh B Pham
(74) *Attorney, Agent, or Firm* — Carr & Ferrell LLP

(57) ABSTRACT

Methods and systems are disclosed for implementing a Large Language Model utilizing a prompt attention-processing subsystem and a generation attention-processing subsystem. A sequence of tokens is first processed by a prompt attention-processing subsystem, which utilizes an associated prompt KV-cache to store matrix values generated during prompt attention-processing. Upon the completion of prompt attention-processing, the populated prompt KV-cache is transferred to a generation KV-cache for processing by the generation attention-processing subsystem. The prompt and generation attention-processing subsystem can be multi-headed. The separate processing of the prompt facilitates efficient computations. Further, the prompt can be processed in segments that match available memory and computational resources. The generation attention-processing subsystem then produces an output token sequence based on the prompt KV-cache values transferred to the generation attention-processing system. The described system ensures optimized processor and memory usage and streamlined processing for large language model systems.

20 Claims, 9 Drawing Sheets

(56) References Cited

U.S. PATENT DOCUMENTS

| | | | | |
|---|---|---|---|---|
| 2024/0403722 | A1* | 12/2024 | Yu | G06N 3/063 |
| 2025/0173561 | A1* | 5/2025 | Blacklock | G06N 3/063 |
| 2025/0231883 | A1* | 7/2025 | Chen | G06F 12/0875 |
| 2025/0272145 | A1 | 8/2025 | Chuang et al. | |
| 2025/0321890 | A1* | 10/2025 | Dhakal | G06F 12/0802 |

* cited by examiner

SYSTEMS AND METHODS FOR HETEROGENEOUS LARGE LANGUAGE MODEL PROMPT ATTENTION-PROCESSING

CROSS-REFERENCE TO RELATED APPLICATIONS

This non-provisional application claims the benefit and priority of U.S. Provisional Application Ser. No. 63/637,260, filed on Apr. 22, 2024, entitled "Systems and Methods for Heterogeneous Large Language Model Prompt Processing," all of which is hereby incorporated herein by reference, including all appendices as if fully set forth herein. The present application is related to the U.S. Non-Provisional Application Ser. No. 19/059,789, filed on Feb. 21, 2025 entitled "Systems and Methods for Heterogeneous Large Language Model Encoder and Decoder Processing," all of which are hereby incorporated herein by reference, including all appendices as if fully set forth herein.

TECHNICAL FIELD

The present application relates to the field of Large Language Model (LLM) processing. More specifically, the application relates to semiconductor systems and methods for efficient LLM prompt attention-processing in a heterogeneous environment.

BACKGROUND

It should not be assumed that any of the approaches described in this section qualify as prior art merely by virtue of its inclusion in this section.

The paper "Attention Is All You Need" by Ashish Vaswani et al., published at the 31st Conference on Neural Information Processing Systems (NIPS 2017), Long Beach, CA, provides a Transformer network architecture based solely on attention mechanisms. The provided attention mechanism dispenses with recurrence and convolutions and thus provides a Transformer architecture that more efficiently provides a longer window from which to reference than is provided by Recurrent Neural Networks, Gated Recurrent Units (GRUs), or Long Short-term Memory (LSTM).

The attention mechanisms in LLMs are memory access intensive. Thus, there is a need for memory architectures for attention-based systems that are cost-effective and efficient. Further, the initial processing of a prompt is adaptable to the parallel processing of tokens within the prompt. What is needed are methods and systems that take advantage of the parallel processing structures.

SUMMARY OF THE INVENTION

According to some embodiments, the present invention is directed to methods and systems for Large Language Model (LLM) processing. In one aspect of the invention, a method is disclosed for implementing an LLM. The LLM includes a prompt attention-processing subsystem, and a generation attention-processing subsystem based on self-attention processing. The neural aspect of the attention-processing subsystems relates to the subsystems having at least one head or being multi-headed. Each head is a fully connected neural network that has been trained. Each head is usually trained with a different training set.

An exemplary embodiment of the method for implementing an LLM model includes providing a prompt attention-processing subsystem that includes a prompt KV-cache, a prompt weight processing component, weights, and a generation attention-processing subsystem having a generation KV-cache and a generation weight processing component. The prompt and generation attention-processing subsystems, and prompt and generation weight processors, can be implemented with an array of neural processing units (NPUs), graphic processing units (GPUs), custom hardware providing high-speed parallel multiply and accumulate parallel processing, or a combination thereof. The prompt KV-cache and generation KV-cache can be high bandwidth memory (HBM 1, 2, 2E, 3, 3E, and 4), double data rate (DDR, DDR1 or DDR2) memory, in any combination. The prompt and generation KV-caches can be coupled to the attention-processing subsystem processors with a dedicated memory bus for each attention-processing subsystem.

The LLM system or prompt attention-processor subsystem can additionally utilize a general-purpose CPU to perform the process of tokenizing an input prompt.

The method of implementing a neural LLM system comprises processing a prompt. The prompt is usually a user-generated input but can include other inputs including other symbols or images or segments of images. The prompt is broken into a plurality of tokens and is processed by the prompt attention-processing subsystem. This processing results in the generation of a KV matrix and thereby populates the prompt KV-cache with values associated with the prompt attention-processing of the tokens from the prompt. Upon completion of attention-processing the tokens, the prompt KV-cache is transferred into the generation KV-cache of a generation attention-processing subsystem. The generation attention-processing subsystem then generates an output sequence of tokens based on the transferred KV-cache values.

The prompt attention-processing subsystem and the generation attention-processing subsystem include at least one head. A head is also referred to as an attention head or an LM head. The head is a neural network that is trained for a neural model to attend to aspects or "subspaces" of the input sequence concurrently, thereby enriching the model's understanding of the data. Often LLM attention-processing subsystems utilize multi-headed attention, where each head is attending to different aspects of the data, by each head having different learned neural weights. Thus, multi-head attention can attend to multiple different aspects of an input prompt and the following LLM generated data. In the context of large language models (LLMs), the term "head" typically refers to attention heads, which are the parallel attention operations within the multi-head attention mechanism. Each "head" operates independently and has its own set of query (Q), key (K), and value (V) weight matrices. For example, Chat GPT-3 has 96 layers with 96 attention heads each, performing 9,216 attention operations each time it predicts a new word.

In another embodiment of the method of implementing an LLM with a prompt attention-processing subsystem, the prompt can include too many tokens for processing by the prompt attention-processing subsystem. Accordingly, the prompt, which is represented by a plurality of tokens, is broken into token segments. Upon the completion of processing a token segment by the prompt attention-processing subsystem, the prompt segment KV-cache is transferred over to the generation KV-cache. Because many processing systems provide parallel processing, in one embodiment, the token segment is processed in parallel. For example, one hundred and twenty-eight tokens could be processed in parallel. This processing token segments, and transferring the prompt KV-cache to the generation KV-cache continues until the tokens associated with the prompt are completely processed.

The memory used for the prompt KV-cache and generation KV-cache can be accessed by different processors on the prompt attention-processing subsystem and the generation processing subsystem. Having a separate memory bus for the prompt and generation KV-caches provides faster subsystem speed. Therefore, the LLM system can be implemented with a separate memory bus for the prompt KV-cache and the generation KV-cache. The prompt and generation KV-cache can be implemented with the same or different types of memory including High Bandwidth Memory (HBM) and Double Data Rate (DDR) memory or any other suitable memory type.

In another aspect of the invention, an attention-based LLM system with prompt attention-processing is disclosed. The system is comprised of a prompt attention-processing subsystem and a generation attention-processing subsystem.

The prompt attention-processing subsystem includes a prompt KV-cache memory and can include a plurality of prompt special-purpose processors. The plurality of prompt special-purpose-processors include NPUs, GPUs, and any other special-purpose processors configured to provide high speed parallel multiply and accumulate functions. Said prompt special-purpose-processors are configured to execute instructions stored in a program memory configured to perform the method of prompt attention-processing. The method of prompt attention-processing includes processing a prompt comprising a plurality of tokens, which results in populating the prompt KV-cache with values associated with the prompt attention processing of the plurality of tokens. Additionally, the prompt attention-processing subsystem is configured to transfer the prompt KV-cache values to a generation KV-cache of the generation attention-processing subsystem upon completion of the prompt attention-processing. A Person of Ordinary Skill in the Art (POSITA) for LLM processing would know how to perform the matrix computations to generate the prompt KV-cache values. Further, a POSITA would know how to perform the multi-head computations, and other processing computations to generate attention-processing for an LLM system.

The generation attention-processing subsystem includes a generation KV-cache, and a plurality of generation special-purpose-processors. The generation special-purpose-processors are configured to execute instructions stored in a program memory configured to perform the method of generation attention-processing. The method of generating attention-processing includes generating a token output sequence based on the transferred KV-cache upon receiving the KV-cache by the generation attention-processing subsystem.

Additionally, the LLM system with prompt attention-processing can include encoding the prompt into a plurality of tokens. This function can be performed in the prompt attention-processing subsystem or can be performed by a general-purpose CPU.

Both the prompt attention-processing subsystem and the generation attention-processing subsystem include an attention head, which is a neural network that is trained to focus on an aspect of the data set. Both the prompt attention-processing subsystem and the generation attention-processing subsystem can be multi-headed, each requiring its own processing memory. Further, the one or more heads for the prompt attention-processing subsystem and the generation attention-processing subsystem use identical weights for each head.

The length of a prompt, thus the length of the token sequence, can exceed the memory available within a prompt attention-processing subsystem. To handle long token sequences, the token stream can be broken into token segments wherein the token segments are processed sequentially by the prompt attention-processing subsystem. After each token segment is processed, the prompt KV-cache is transferred to the generation KV-cache.

In one embodiment, the plurality of prompt special-purpose processors are configured to process each token segment in parallel. For example, a parallel processing system that can support up to one-hundred twenty-eight processing paths thereby supports the parallel processing of up to one-hundred twenty-eight tokens.

The prompt attention-processing subsystem and the generation attention-processing subsystem can operate independently with separate memory buses to the prompt and generation KV-cache. The memory buses can be compatible with HBM type memory or DDR memory.

BRIEF DESCRIPTION OF THE DRAWINGS

Exemplary embodiments are illustrated by way of example and not limited by the figures of the accompanying drawings, in which like references indicate similar elements.

DETAILED DESCRIPTION OF EXAMPLE EMBODIMENTS

The following detailed description includes references to the accompanying drawings, which are a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, functional, logical, and electrical changes can be made without departing from the scope of what is claimed. The following detailed description is, therefore, not to be taken in a limiting sense, and the scope is defined by the appended claims and its equivalents.

LLM Overview

Figure 6:
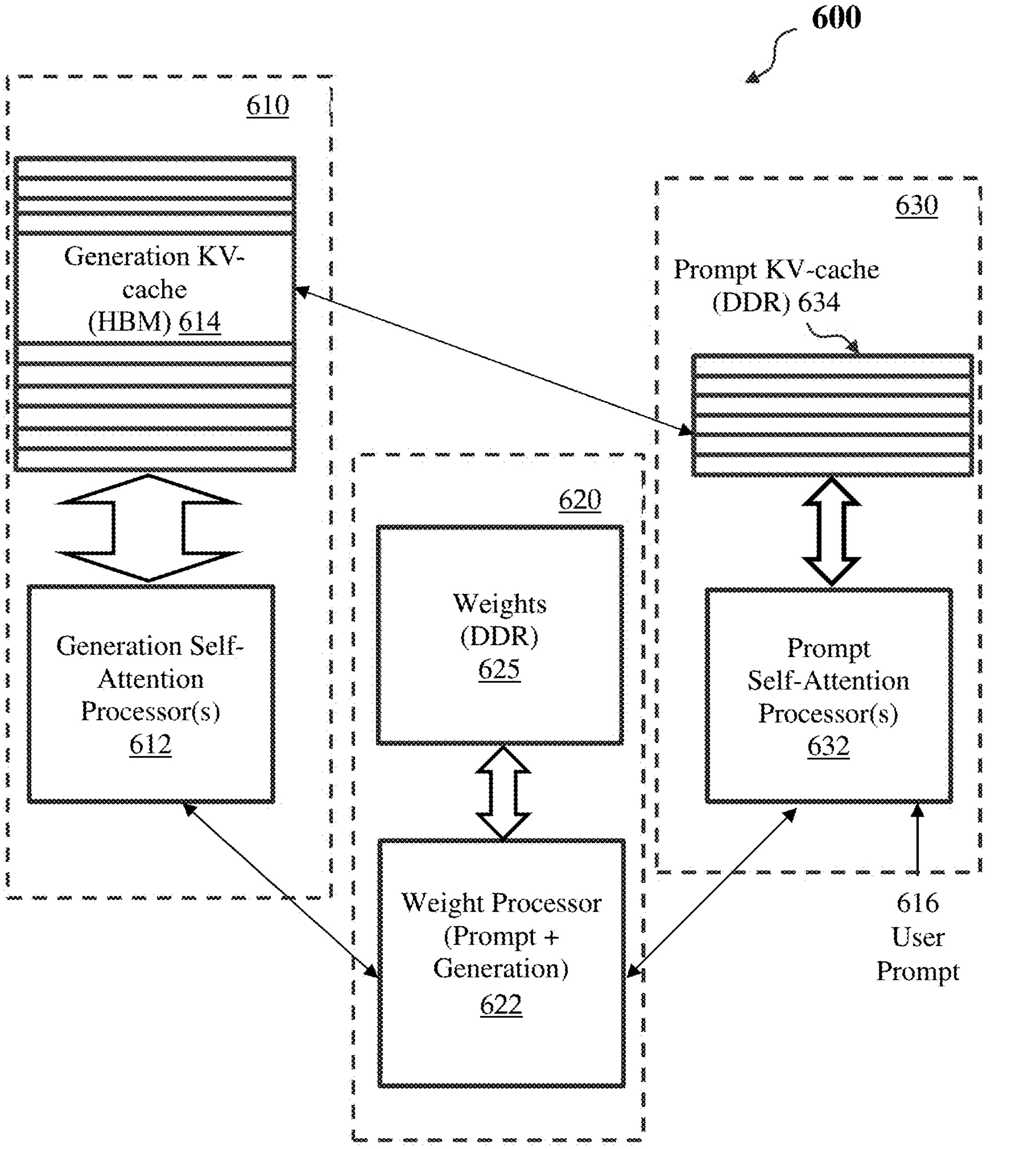
FIG. 6—Illustrates a block diagram of an embodiment with a separate prompt attention processing from the batch processing of prompts.
Figure 7:
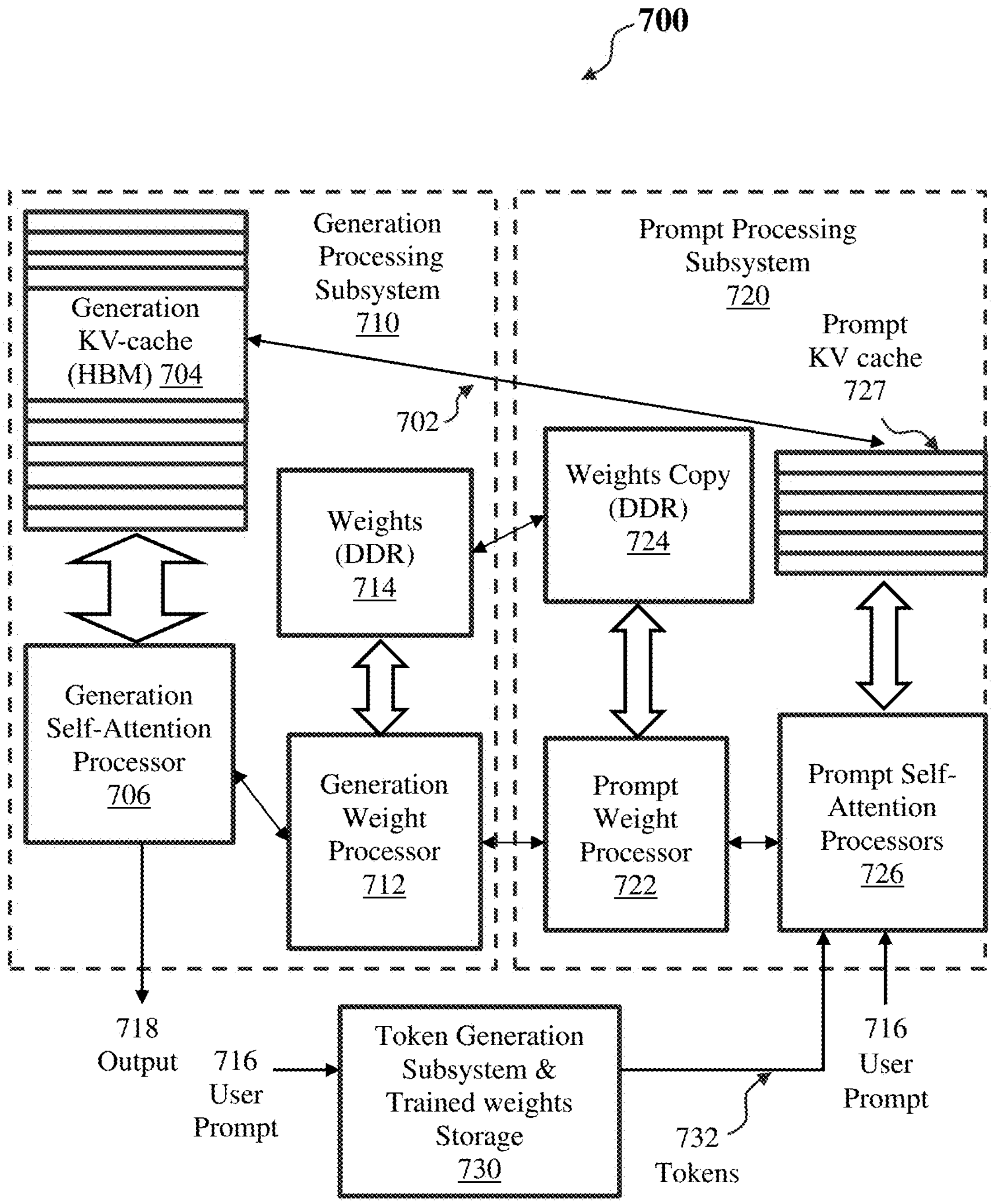
FIG. 7—Illustrates a block diagram of an embodiment with a separate prompt attention processing that includes prompt weight processing.
Figure 8:
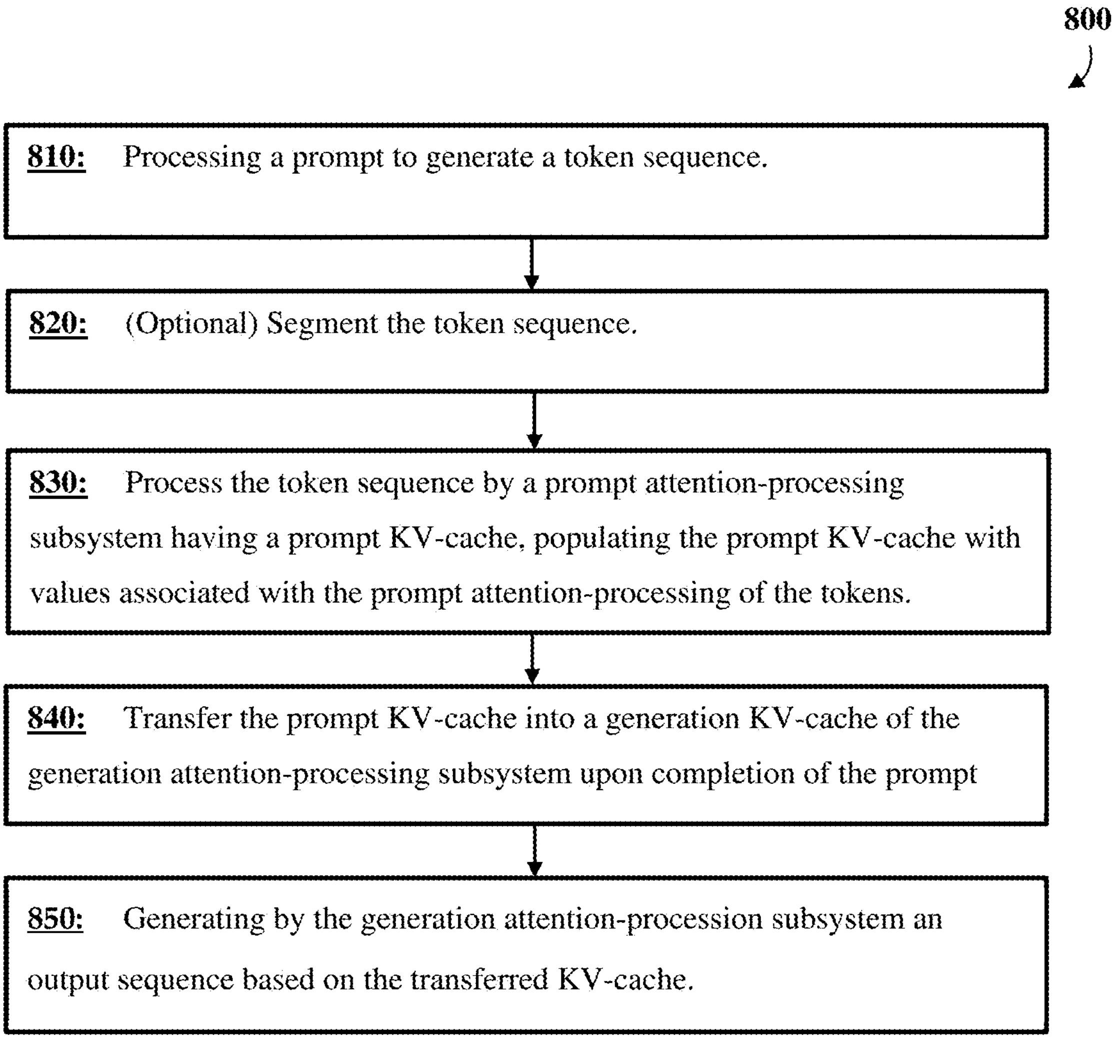
FIG. 8—Is a flow diagram of the method of an LLM process with a prompt attention-processing subsystem and a generation attention-processing subsystem to process a prompt.

FIGS. 1A, 1B, 2, 3A, 3B, and 4 provide an overview of Large Language Models (LLMs) that use an "Attention" architecture. FIG. 5 shows different processors and memory models for LLM processing. FIG. 6 provides a block diagram of an architecture that includes heterogeneous LLM prompt attention-processing that includes separate prompt attention-processing where the weight processing is shared between the prompt and generation attention-processing subsystems. FIG. 7 provides a block diagram of an architecture that includes heterogeneous LLM prompt attention-processing that includes separate prompt attention-processing where the prompt and generation attention-processing subsystems each have their own weight processing component. FIG. 8 is a flow diagram of an LLM system utilizing a separate prompt processing system.

Heterogeneous LLM Prompt Attention-Processing

Described below is a Heterogeneous system for LLM processing that makes optimal use of memory bandwidth by placing the KV-cache into a high bandwidth (and high cost) memory and the weights (parameters) into a lower bandwidth (and lower cost) memory. These two types of memories are connected to different chips, and the work can be distributed across those chips in an interleaved manner as the processing moves from Self-Attention (KV-cache processing) to Feed Forward (weight processing) as each transformer layer is processed. This configuration works well for batch processing, where multiple input prompts from different users are being processed. This is useful where the encoder processing and decoder processing is generating one token at a time.

A new and novel system embodiment, as shown in FIGS. 6 and 7, includes a separate prompt attention-processing subsystem. The prompt attention-processing subsystem has different memory bandwidth requirements. Accordingly, further optimization is possible for an LLM system utilizing prompt attention-processing.

During token generation by the LLM using a self-attention architecture for processing, many batches can be processed in parallel. The number of batches can be over a hundred. Each batch corresponds to a different user query. Thus, the underlying system is capable of processing many tokens at once, with the weight processing part reading the weights once for all batches and the KV-cache (self-attention) processing part reading a different KV-cache for each batch, with the number of KV-caches read being the total number of batches processed at once.

However, during prompt attention-processing, it is possible to use separate processing components to process the multiple tokens of the prompt from a single user query. This is advantageous because it reduces the time to process the prompt and produces the first output token faster.

During this prompt attention-processing phase, the weights are read at the same rate as during generation, as all batches share the same weights in both cases. However, the KV-cache requirement is different for prompt attention-processing because instead of reading and writing many different KV-caches, only a single KV-cache is read and written, resulting in a much lower bandwidth requirement. For instance, if the KV-cache size is 4,096, and for batch processing with 200 batches, during token generation, 4096×200 tokens must be read, and 200 tokens must be written, for a total of 819,400 accesses. However, during single prompt attention-processing, only 4096 tokens need reading, and 200 need writing, for a total of 4,296 accesses.

Thus, in the embodiment shown in FIG. 6, a prompt attention processing unit stores the KV-cache during prompt attention-processing, also referred to as the prompt KV-cache. The KV-cache for prompt attention can be stored in slower, less expensive, and lower bandwidth memory, such as DDR memory. This memory is slower and less expensive than on-chip HBM memory. High Bandwidth Memory (HBM) is a computer memory interface for 3D-stacked synchronous dynamic random-access memory (SDRAM). There are several standards contemplated for HBM including HBM 1, 2, 2E, 3, 3E, and 4. After the prompt has been completely processed, the process flow proceeds to the generation phase where the KV-cache contents, from the prompt attention-processing, are moved from the lower bandwidth memory to the higher bandwidth memory within the generation attention-processing subsystem.

There are different architectural embodiments that utilize prompt attention processing. At one end of the spectrum, prompt attention processing could process an entire prompt if it is short enough to fit in memory, say 200 to 2000 tokens at a time. Processing continues until the prompt attention processing completes the processing of a single user's prompt input. This implementation would require storage for one single KV-cache, a very modest requirement that can be performed utilizing only on-chip memory. This embodiment would considerably lower the power consumption of the LLM system.

However, prompts can be much larger. For example, a prompt could be an article that has tens of thousands of tokens. Such a large prompt would require a large KV-cache, which would increase the required memory, power and could increase the processing time if off chip memory (DDR) is required. To resolve this design constraint, the prompt can be broken into smaller segments. Each segment of a long prompt is processed sequentially by the prompt attention-processor. These segments can be of fixed size or variable size. The prompt KV-cache is transferred to the generation KV-cache after each segment is processed.

In yet a further embodiment of an LLM system, the prompt attention processing component can implement just the prompt KV-cache (self-attention) portion of the process and can include the weight processing part, with its own copy of the weights. Similarly, the prompt attention-processing system could be an additional component to the existing weight processing part.

The system can also be extended to several prompt processors, each of which works on a part of the prompt. Or multiple prompts can be processed by one prompt processor.

LLM Attention Processing Overview

At a high level, Large Language Models (LLMs) transform machines are generally built using several transformer layers. This section is only intended to provide an overview of LLM operations and not an exhaustive description. A POSITA in the technology area of LLMs would know the specific processing steps needed to provide self-attention processing and attention-processing.

The job of the LLM is to predict the next token in a sequence of tokens. A token roughly corresponds to a word, but sometimes a word might translate to multiple tokens. The sequence of tokens that make up the prompt are fed into the LLM; then the LLM starts generating its answer one token at a time. After a token is generated, it is fed back into the LLM so that the LLM knows what tokens it has already generated.

Within the LLM, the token is mapped into a long list of numbers known as an embedding (e.g., 8,192 numbers). This embedding is then mapped in various ways into other long lists of numbers. These are known as activations.

A transformer layer is itself made up of a number of layers, the most important of which are the Multi-Headed Attention Layer and the Fully-Connected layer.

The Multi-Headed Attention layer's job is to relate the current input token to the previous tokens the LLM has seen and has generated. To make this task practical, there is a limit on how far the attention goes back into the past. This is known as the context window. The Multi-Headed Attention starts by mapping the input token's embedding into three different activations called the Key (K), Value (V), and Query (Q). The next step is to perform a mathematical operation on the current Query and all the previous Keys and Values in the context window. Note that to do this, we need to either recalculate the previous Keys and Values for all the embeddings in the context window or store all the previous Keys and Values in the context window. The latter option is much more preferable, especially for long context windows. The store of the Keys and Values is called the KV cache.

The fully connected layer is a type of neural network that contains a large number of parameters (also known as weights) that process the input activation and turn it into an output activation. These parameters are learned during training and do not change during operation. These parameters form most of the parameters in the LLM.

The rate that an LLM can generate a response is limited by the time it takes to process a token through the whole network because each token depends on the previous token. So, processing must be performed serially with only one new token for the stream, being worked on at any one time.

To increase the throughput of the LLM we use a technique called batching, where the LLM processes multiple streams at once. So, the LLM can handle queries from multiple users at once. Thus, although the rate of each single stream is not increased, the total rate at which tokens are generated is increased by the batch size.

If we look at the batches in the Feed Forward Network part of the LLM, we see that all the batches use the same parameters. Thus, there is no extra cost in terms of memory bandwidth to increase the batch count. The extra batches consume processing power, but it is possible to provide sufficient processing power for quite high batch counts.

The KV cache, however, does have to store all the values independently for all batches. Thus, the size of the KV cache needed is directly proportional to the batch count. As the whole of the KV cache must be read for each batch's worth of tokens generated, this increase in batch size also increases the memory bandwidth needed.

So, for high batch counts, we require large KV caches, which require large high bandwidth memories. In contrast, the Feed Forward Network requires lower bandwidth. Thus, in order to build a system that makes optimal use of memory bandwidth, we place the KV cache into a high bandwidth (and high cost) memory and the weight parameters into a lower bandwidth (and lower cost) memory. These two types of memories are connected to different chips, and then the work is distributed across those chips in an interleaved manner as the processing moves from Attention to Feed Forward as each transformer layer is processed.

This technique is generally applicable for any AI task where there is memory bandwidth that is independent of batching mixed with memory bandwidth that depends on batching. It allows an optimal solution to be built, maximizing the batching while balancing the memory cost of each part of the system independently.

Figure 1A:
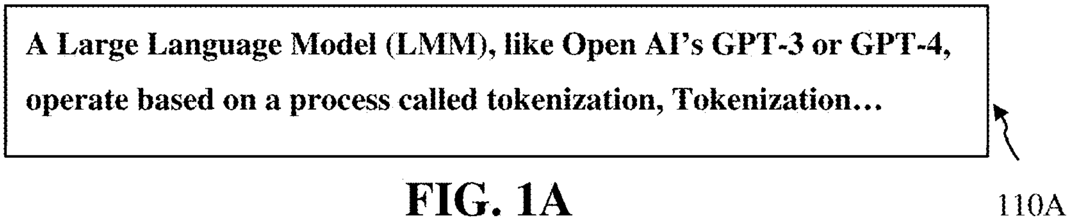
FIG. 1A—Shows a sentence that can be tokenized.

FIG. 1A shows "a sentence" 110A before tokenization for input to a prompt attention-processing subsystem within an LLM Transformer. The sentence such as the one shown in FIG. 1A can be input into a prompt attention-processing subsystem based on an attention mechanism after tokenization. Examples of Transformer Machines include chat bots like ChatGPT-3 and ChatGPT-4.

Figure 1B:
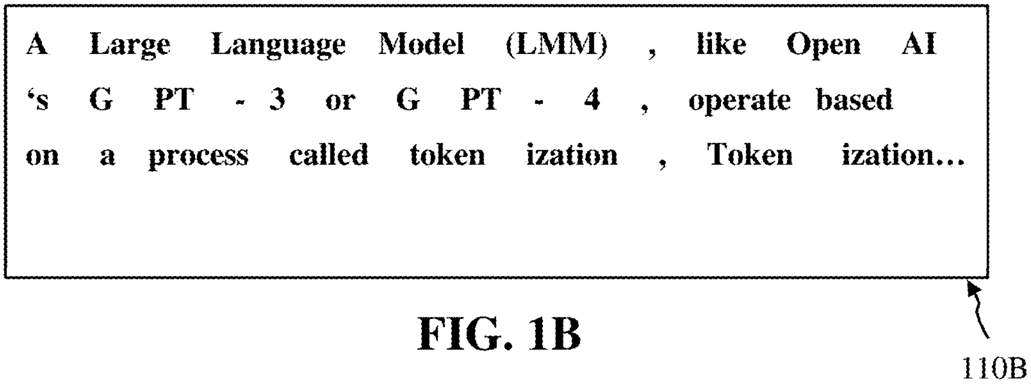
FIG. 1B—Shows the sentence of FIG. 1A tokenized into tokens.

FIG. 1B shows the sentence 110A after being tokenized. The tokens 110B can be the token sequence input into a prompt attention-processing subsystem of a Transformer Machine. Some words can become a token where other words may become multiple tokens.

Figure 2:
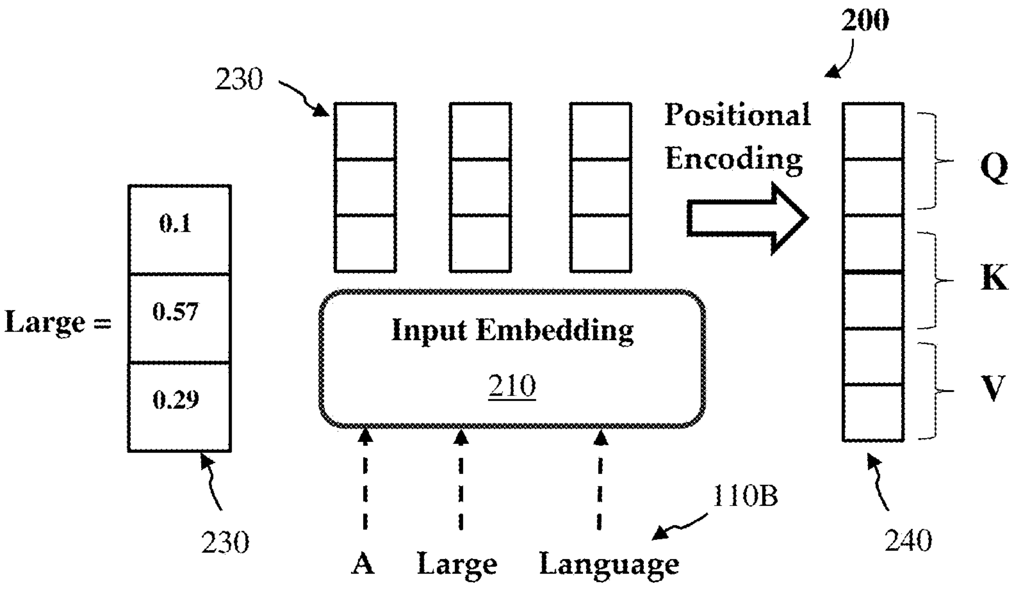
FIG. 2—Shows a block diagram of the Input Embedding of tokens generating input vectors.

FIG. 2 shows the encoding 200 of tokens 110B into a word-embedded layer 240. The word-embedded layer 240 encodes a representation of the tokens into numbers 230. The word-embedding 210 converts a token into a vector representation of a token. The embedded layer 240 numbers include a vector representation of the word and positional information of the tokens.

Figure 3A:
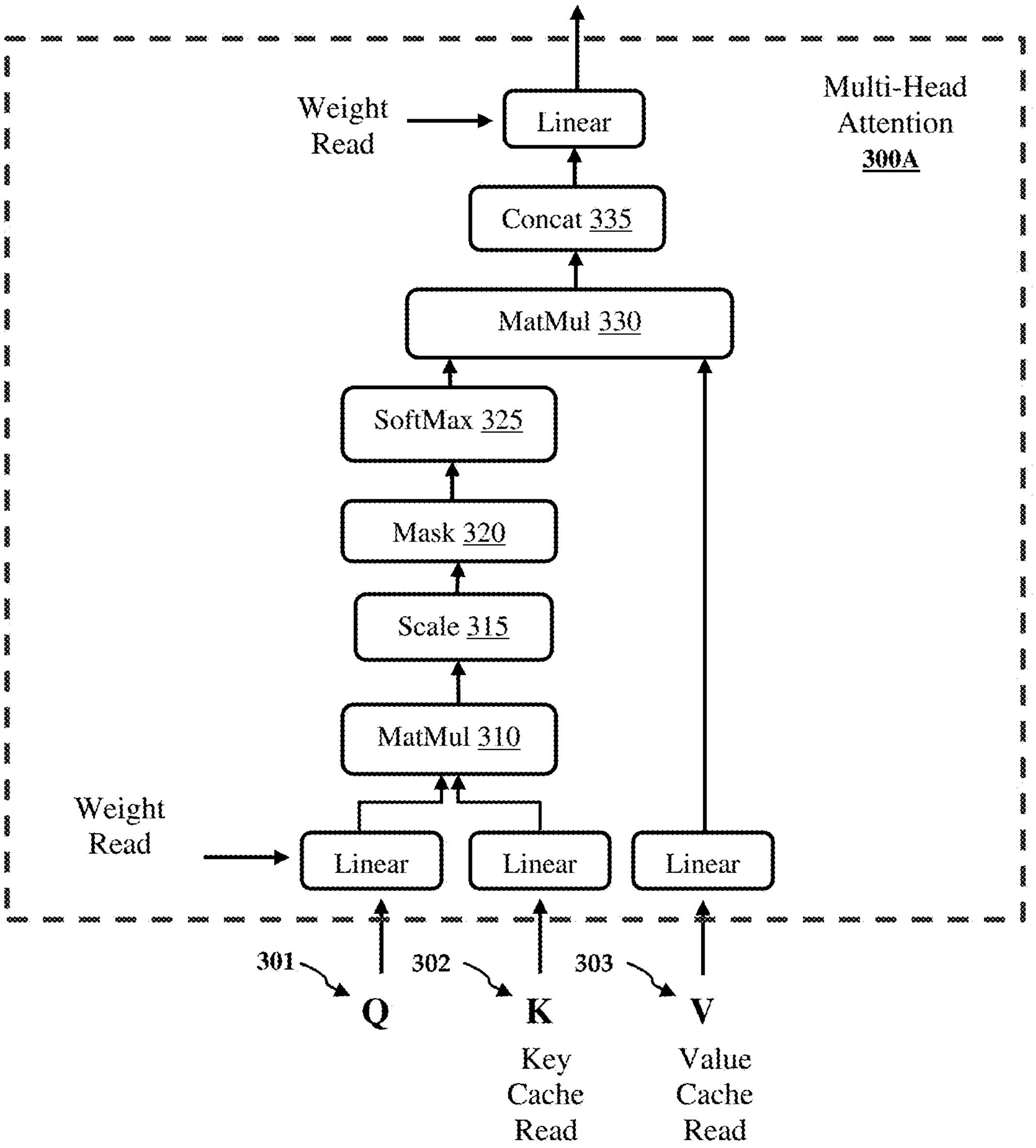
FIG. 3A—Shows a block diagram of multi-headed attention processing.

FIG. 3A shows the processing components of a multi-headed attention model 300A. In the shown embodiment, the attention mechanism generates self-attention where the model provides an association between each token with each of the other tokens in the input. The inputs to the first "Linear" layer are the Q 301, K 302, and V 303 vectors. These represent the Query, Key, and Value inputs. The query 301 and key 302 undergo a dot-product multiplication 310 to generate a scores matrix. The scores matrix indicates how much focus should be put on other input words. Then, the scores get scaled down 315 by the dimension of the keys 315. This step is performed to prevent exploding gradients.

Self-attention layers in the decoder allow each position in the decoder to attend to all positions in the decoder up to and including that position. We need to prevent leftward information flow in the decoder to preserve the auto-regressive property. We implement this inside of scaled dot-product attention by masking out (setting to $-\infty$) 320 all values in the input of the softmax function 325 which correspond to illegal connections. Next, a SoftMax function 325 is performed on the normalized scores to generate probability values between zero and one. Next, the attention weights are multiplied 330 by V, the value.

To make the model into a multi-headed computation, the Q, K, and V vectors need to be split into multiple vectors. Each of the vectors go through the same self-attention process individually. Each self-attention process is called a head. Each head generates an output vector which are concatenated 335 into a single vector before going into a linear layer. In theory, each head would learn something different, therefore giving the encoder model more representation capability.

Figure 3B:
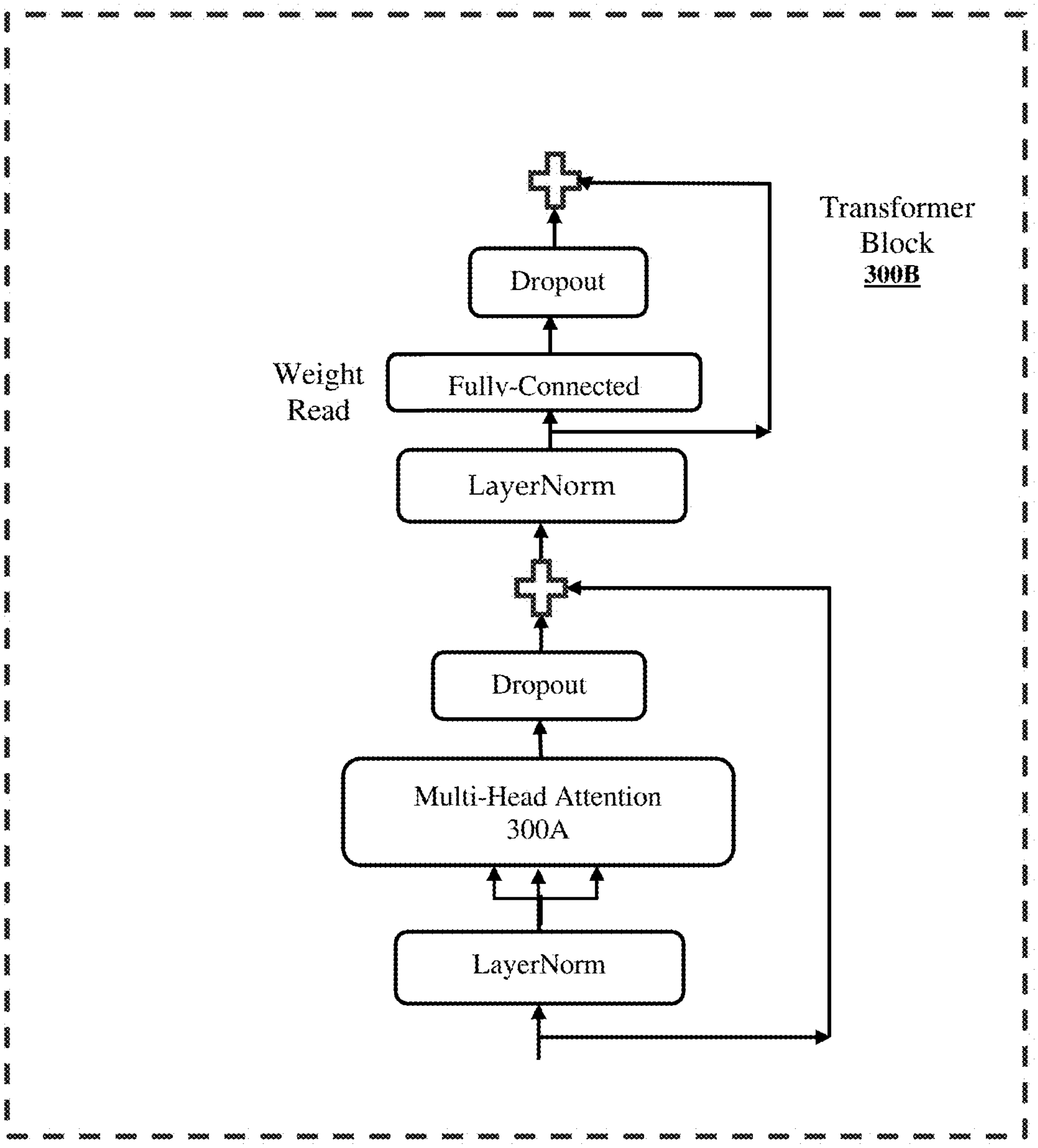
FIG. 3B—Shows a block diagram of Transform Block processing.

FIG. 3B shows a block diagram of the processing components for performing a Transformer block. Functions, such as a Transformer, can be performed across multiple processors where each of the processors has dedicated memory depending on the requirements for reading and writing to memory.

Some of the Transformer functions utilized the same weights, so the accessing of memory is low, while other functions require a large amount of memory and a high memory access requirement. For example, in the shown Transformer function 300B, the multi-headed attention processing 300A can utilize separate memory and generate a high memory access rate. In another embodiment, the memory can be shared with other processes. This processing can be allocated to a processor coupled to High Bandwidth Memory (HBM). A processing function, such as the Fully-Connected component, the weights can be constant, and the processing function can be allocated to a processor with slower and lower-cost memory, such as Double Data Rate (DDR) memory.

In the example 300B shown, batch input processing can be implemented. Some of the functions, such as the fully connected layer where the weights do not change between different inputs, can be shared. Thus, the memory reads can be shared across batch inputs and utilize lower cost and slower memory.

In summary, multi-headed attention is a module in a transformer network that computes the attention weights for the input tokens and produces an output vector with encoded information on how each token should be added to each of the other words in the sequence.

Figure 4:
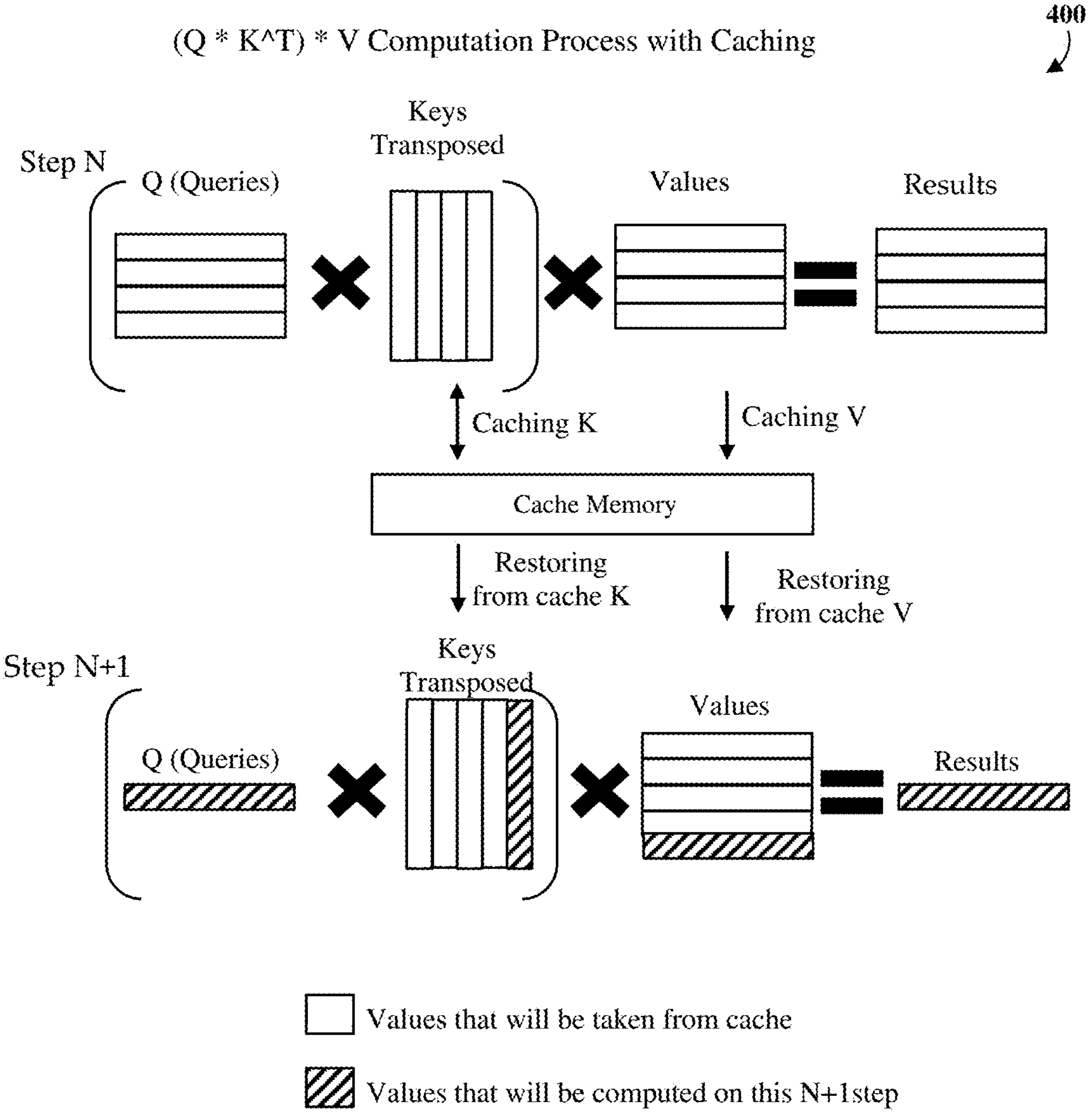
FIG. 4—Illustrates the computation process and caching of the (Q*K^T)*V computation.

FIG. 4 shows the matrix processing and flow 400 of data from cache memory for the (Q*K^T)*V processing of Q, K, and V matrixes. As each new token is processed, step N+1, only one new (Q*K^T) vector needs to be processed. In this N+1 step, when a new query is calculated, only one new (Q*K^T) dot-product needs to be calculated for the new Q vector and is added to the KV cache. Thus, most of the Q*K results can be read from cache memory. This results in a large memory read demand, also known as pressure, but much fewer write cycles.

Figure 5A:
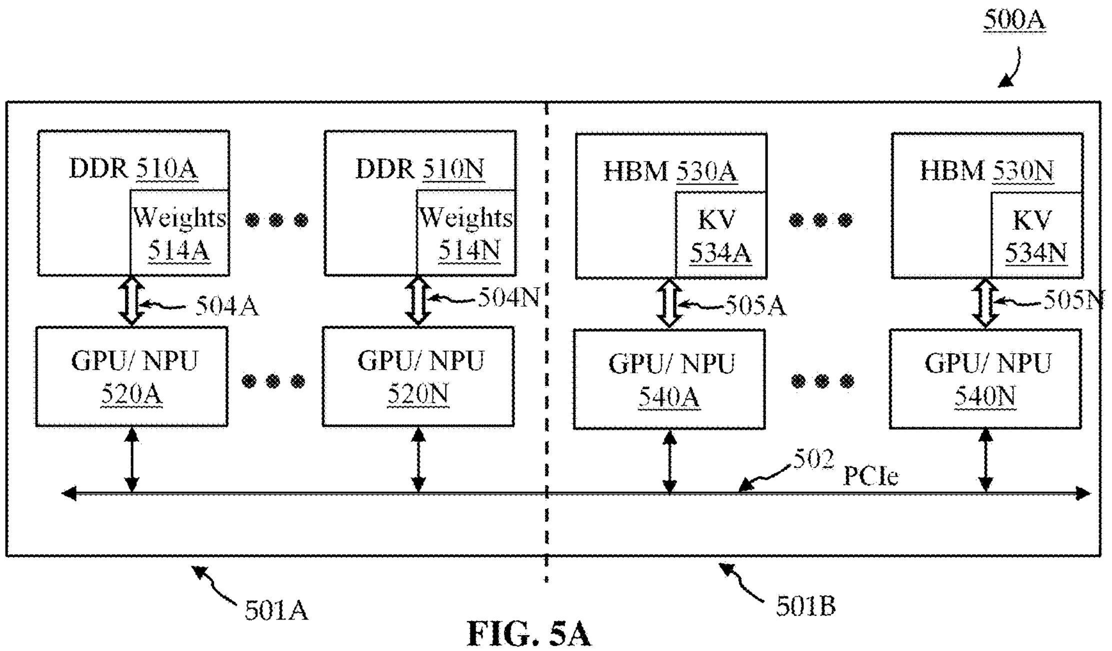
FIG. 5A—Illustrates a block diagram of one embodiment of the memory and processing architecture for processing based on an attention mechanism for large language models.

FIG. 5A shows an embodiment of a processor memory architecture 500A, where one processing set of functions are processed by one set of processors 520A-N utilizing one type of memory 510A-N and another set of processors 540A-N processing another set of functions utilizing another type of memory 530A-N. The processors can be of the same type or different types, including but not limited to custom or commercial Neural Processing Units (NPUs) or commercial or custom Graphic Processing Units (GPUs). The memories 510A-N and 530A-N and processors 520A-N and 540A-N can be chiplets mounted on one or more silicon substrates 501A-B. The substrates 501A-B can be a continuous substrate or multiple substrates. The chiplets can include a plurality of processors (NPU/GPU) with one or more buses to interconnect with memory and other processors. The silicon substrate can be any suitable material. The most common substrate material used for semiconductor chiplets is silicon (Si), as it is the primary material for most semiconductor devices due to its excellent electrical properties, availability, and cost-effectiveness; however, depending on the application, other materials like silicon carbide (SiC) or gallium arsenide (GaAs) might be used for specialized chiplets requiring high power or high frequency capabilities. These processors are commonly found on chips and systems and boards made by NVIDIA®.

When referencing the component "memory", or a "memory type", this reference, refers to a block of memory that is only accessible by a processor or a set of processors over a dedicated bus. However, in some embodiments, a processor can be a cluster or matrix of processors, including but not limited to NPUs and GPUs. The size of the "memory" can range from kilobytes to gigabytes. The memory width can be multiple bytes wide or any number of bits. The "memory" can be formed on a semiconductor chip with the processors or be formed on a separate chiplet that is bonded to a substrates 501A 501B in a 2.5D or 3D architecture.

In LLM models, some processing functions require high access to memory. In a system providing LLM processing, processors that process functions requiring high-speed access are tied to faster memories but more expensive memories. One example, but not by way of limitation, is High Bandwidth Memory (HBM) defined by standards for HBM including HBM 1, 2, 2E, 3, 3E, and 4. This memory can be coupled to a GPU, NPU, or other suitable processors. Processing functions that have larger memory requirements or may require less memory bandwidth can use less expensive memory. DDR memory is one option for less expensive large memory suitable for this type of processing. DDR memory includes the different generations of DDR memory, including DDR2, DDR3, DDR4, and DDR5.

The transformer blocks of an LLM include the processing of a fully connected neural network. When in use by an LLM model, these neural networks are typically previously trained. The token processing requires a high memory bandwidth to read the neural weights used to generate neural network activations. As shown in FIG. 5A, the neural weights 514A-N are fully or partially cached in the DDR memories 510A-N. Using the code for the transformer block, the processors 520A-N can provide the neural network and other transformer block processing for the LLM.

The processors 520A-N, which provide the neural network processing, can be divided up to provide activations by neural network layer or divided up to provide one or more activations by a processor within the neural network. For best processing throughputs, the processors 520A-N will be generating approximately the same number of neural activations. This can vary if a neural network node has more weight inputs than other nodes.

Because some processes, like the Transformer LLM, are serial processes, there can be idle time for some of the processors 520A-N. The neural network activations flow from processor to processor.

Thus, the processors 510A-N can be utilized more effectively by dividing a batch of inputs into multiple sub-batches. These sub-batches can be scheduled on the relevant processing engine, the NPU or GPU for example, to keep the processors 510A-N busy. This can reduce memory demand needed to reload neural network weights into the memories 510A-N for the NPU/GPU processors 520A-N. Thus, this architecture can take advantage of utilizing existing NPU/GPU processors 520A-N while adding processing resources through the PCIe bus 502.

For example, when the processor 520A is done computing activations for one token, the processing for the rest of the neural network needs to be completed by the other processors 520B-N. This leaves the processor 520A idle while waiting for the completion. Thus, the processor 520A is available to start processing a token in another batch. Alternatively, the processor 520A can start processing the next sub-batch or portion of a sub-batch.

The communication between the DDR memories 510A-N and the processors 520A-N can be through a dedicated bus 504A-N. This bus can be a standard bus for interfacing with DDR memory or can be a custom bus compatible with the DDR memories 510A-N and the processors 520A-N. Communication between the HBM memories 530A-N and the processors 540A-N can utilize buses 505A-N or custom interfaces.

Communication between processors can be provided by a bus 502 coupled to each of the processors. This bus 502 can be used to load LLM neural network weights 514A-N, and KV cache values 534A-N into the memories 510A-N. Further, activations generated by the processors 520A-N are transferred to the other processors 520A-N using the bus 502. In one embodiment, the bus 502 is a PCIe bus. The loading of weights, a portion of the weights, and code can utilize other processors and systems (not shown) and from storage devices (not shown) coupled to the bus 502.

The LLM processing architecture, shown in FIG. 5A, includes KVQ calculations. These calculations are allocated to processors (GPUs/NPUs) 540A-N, which utilize HBM memories 530A-N through local HBM buses 505A-N. The KVQ calculations are very memory and processing intensive. Thus, it is efficient to cache the KVQ values in a KV cache 534A-N, which is updated as each new token from each batch is processed. If the processors 540A-N are GPUs, these graphic processors are commonly found on chips or chiplets made by NVIDIA®.

Figure 5B:
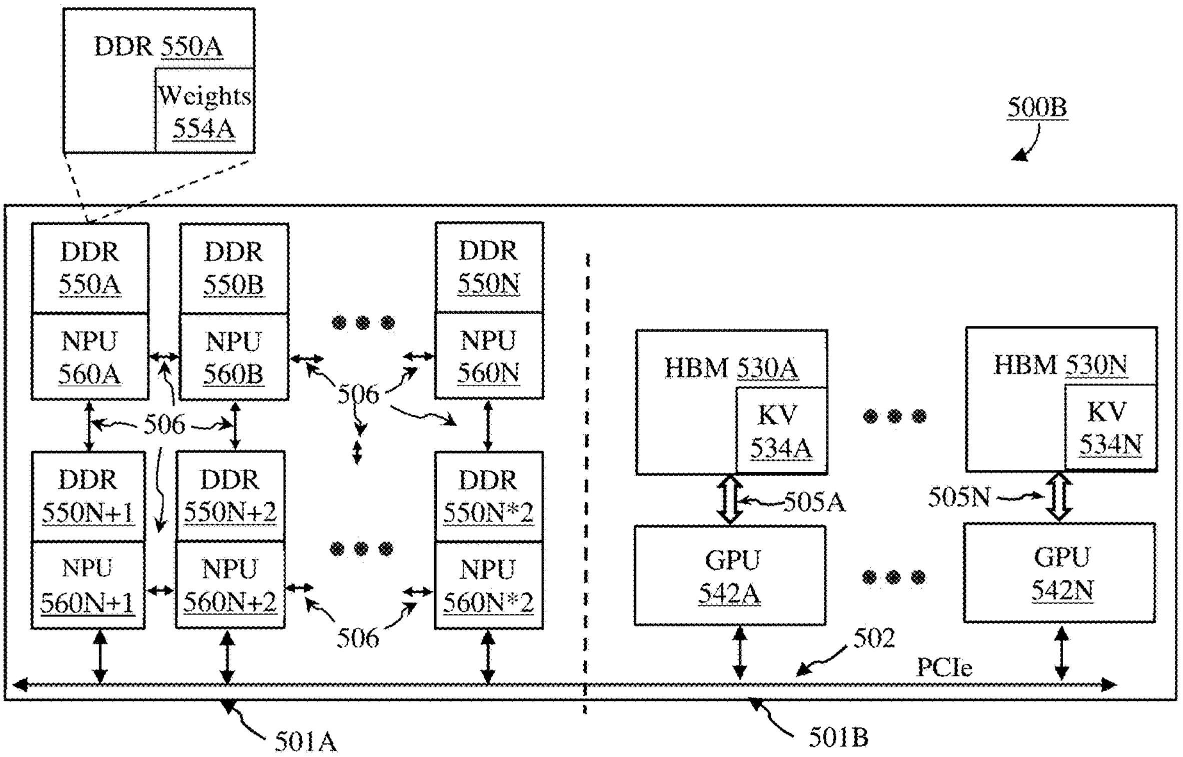
FIG. 5B—Illustrates a block diagram of another embodiment of the memory and processing architecture for processing based on an attention mechanism for large language models.

FIG. 5B shows another embodiment 500B of a memory architecture of the inventive concept. In this memory and processor architecture, the transformer processors 560A-N*2 are NPUs and forming a matrix of processors 560A-N*2 and the associated memories 550A-N*2. Each processor 560A-N*2 can have dedicated inter-processor buses 506 to communicate with adjacent processors. The inter-processor buses are usually used to pass activations between the processors but can be used for other functions including but not limited to moving weights, executable code, and other control information. These connections can be a die-to-die connection. The DDR memories 550A-N*2 can be packaged on top of the NPUs. Again, processes that utilize the neural weights are allocated to the NPU processors, each having its own DDR memory. The memory-intensive processes, such as attention functions KVQ calculations, are allocated to the GPU processors 542A-N with the HBM memories 530A-N. The workflow process of the Transformer can flow from the NPUs to the GPUs over a PCIe bus 502 or another suitable bus.

As discussed above, the transformer blocks, of an LLM system include processing of a fully connected and trained neural network. The token processing requires a high memory bandwidth to read the neural weights used to generate neural network activations. As shown in FIG. 5B, the neural weights 554A-N*2 are fully or partially cached in the DDR memories 550A-N. For readability, not all of the weights are shown in the DDR memories 550A-N*2.

The communication between each DDR memory 550A-N*2 and each of the processors 560A-N*2 can be through a dedicated bus (not shown) similar to the dedicated bus 504A-N used in FIG. 5A. This bus can be a standard bus for interfacing with DDR memory or can be a custom bus compatible with the DDR memory 550A-N*2 and the processors 560A-N*2. Communication between the HBM memories 530A-N and the processors 540A-N can utilize buses 505A-N or custom interfaces.

Communication between the NPU processors 560A-N*2 can be provided over a plurality of dedicated inter-processor buses 506. The plurality of dedicated inter-processor buses 506 can connect each NPU processor 560A-N*2 to all the adjacent NPU processors 560A-N*2. This architecture provides flexibility in allocating neural network processing tasks to the NPU processors 560A-N*2 and flexibility in communicating the generated activation value between the NPU processors 560A-N*2. Further, the dedicated inter-processor buses 506 can be utilized in loading the NPU's code and neural weights 554A. As discussed in FIG. 5A, the loading of weights, a portion of the weights, and code can be provided by other processors and systems (not shown) and from storage devices (not shown) coupled to the bus 502.

As discussed above for FIG. 5A, the KVQ calculations are performed by the GPU processors 542A-N. The GPU processors 542A-N are coupled to the HBM memories 530A-N. The buses and processing are as described above for the processors 540A-N in FIG. 5A.

Figure 5C:
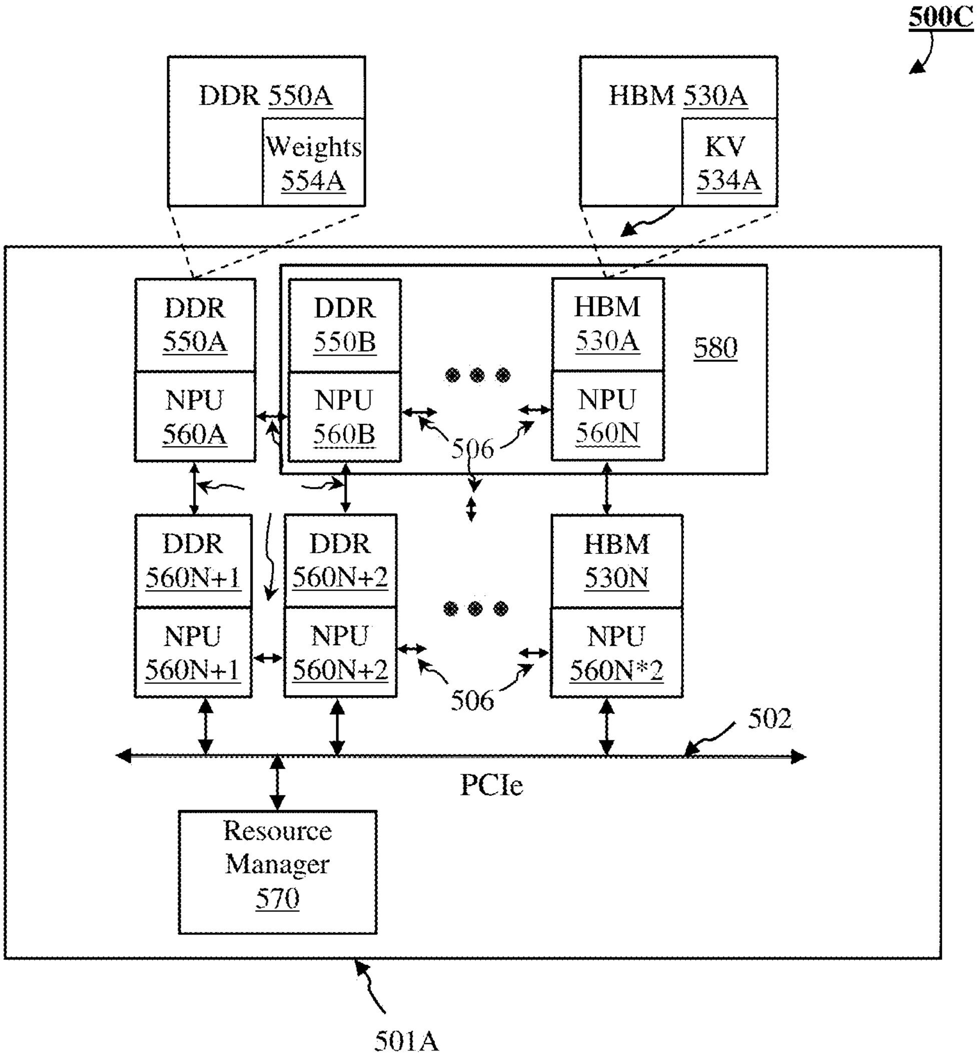
FIG. 5C—Illustrates a block diagram of another embodiment of the memory and processing architecture for processing based on an attention mechanism for large language models.

FIG. 5C shows a further novel embodiment 500C of the inventive concept. In this architecture, all the LLM neural network processing and KVQ calculation are performed by a matrix of NPU processors 560A-N*2. These calculations can be performed by custom processors or by NPU processors. In this memory and processor architecture, the NPU processors 560A-N*2 each have dedicated inter-processor buses 506 to communicate with adjacent processors. Again, processes that utilize the same neural weight values are allocated to the NPU processors each having its own slower and less expensive memory DDR memory. Further, for the processes that are memory intensive, such as the calculating the KV cache values 534A, the NPU processors 560A-N*2 are coupled to HBM memories 530A-N. In one embodiment, the HBM memories 530A-N are chiplets mounted on the same substrate that includes the NPUs. Further, the DDR memories are also chiplets. In some embodiments, the NPUs do not have all the same capability. For example, an NPU may have multiple cores that can range from eight to sixty-four. A plurality of NPUs can be mounted on the same silicon substrate, and DDR memory can be mounted on top of the NPUs. This architecture has the advantage of using the same NPU which can simplify the integration onto a substrate 501A and for code development.

In another aspect of the shown embodiment, the system includes a resource management processor 570. Based on the specific LLM and the LLM's associated characteristics and expected utilization, the processors 560A-N are managed as a resource pool. A group of processors 580 and their associated memories are allocated and configured to provide a specific LLM. Thus, a substrate 501A could have multiple different LLMs operating. This group 580 can be static or dynamic. If not all of the processors and associated memory are not need for a period of time, the stored KV cache values can be move from a memory in the group 580 and store elsewhere included within memory of the resource manager 570 or some storage (not shown) coupled to the system. An unused process within the group 580 can be moved back to a processor pool and used by another LLM that could be operating within the pool of processors.

LLM Systems with a Prompt Processing Subsystem

Referring to FIG. 6, another architectural embodiment of an LLM system 600 with a prompt attention-processing subsystem 630 is shown. In this embodiment, the architecture incorporates a separate prompt attention-processing subsystem 630 where the weight processing subsystem 620 is shared between the prompt attention-processing subsystem 630 and the generation attention-processing subsystem 610. The weight processing subsystem 620 comprises weight processor 622 and weight memory 625. The weight values loaded into the weight memory 625 along with the functions of the weight processor 622 provides a trained neural networks for the attentions' heads within attention processing. The advantage of an LLM system 600 with a prompt attention-processing subsystem 630 is that multiple prompt tokens can be processed in parallel. Thus, the initial processing of the tokens can be quickly processed by a hardware system that supports parallel processing. If the tokens were processed by the generation attention-processing subsystem 610, then each prompt token would have to be completely processed before the next token could be processed. This is because the generated token is fed back into the system to generate the next token.

Shown in a simplified form is the LLM system 600. The system comprises a generation attention-processing subsystem 610, which implements generation-attention processing, and a prompt attention-processing subsystem 630 that incorporates attention processing, also known as self-attention processing. Additionally, LLM system 600 includes a weight processing subsystem 620, which provides shared processing between the generation attention-processing subsystem 610 and the prompt attention-processing subsystem 630.

The generation attention-processing subsystem 610 is comprised of generation self-attention processors 612 that are configured to perform generation attention-processing, and the generation KV-cache 614. The generation KV-cache can be HBM memory to support the high memory demand for updating the cache. However, other memory types are contemplated. The generation self-attention processors 612 can take the form as described above for FIGS. 5A, 5B, and 5C. Upon the completion of the processing of the prompt tokens, the prompt KV-cache 634 is transferred to the generation KV-cache 614.

The prompt attention-processing subsystem 630 is comprised of a prompt self-attention processor 632 and the prompt KV-cache 634. The prompt attention-processing subsystem 630 can provide processing for a full user prompt 616. Alternatively, multiple prompt attention-processing subsystems 630 (not shown) can be utilized to process the prompt in segments or the prompt segments can be sequentially processed by the prompt attention-processing subsystem 630.

The prompt self-attention processor 632 can be a processor on a separate CPU, NPU, MPU, or one or more processors within a matrix of processors. The prompt self-attention processor 632 can be multiple special purpose processors in the form as described above for FIGS. 5A, 5B, and 5C. The prompt attention-processors 632 can be remote and connected to the rest of the LLM processing system by a network connection (not shown). The prompt attention-processing subsystem can utilize slower and less costly DDR memory for the prompt KV-cache 634 or could run on faster High Bandwidth Memory (HBM).

Referring to FIG. 7, another architectural embodiment of an LLM system 700 is shown and described. The LLM system 700 comprises a generation attention-processing subsystem 710 and a prompt attention-processing subsystem 720 and can include a token generation subsystem 730. Each of the generation and prompt attention-processing subsystems 710 and 720 has its own weight processing components comprising the weight processor 712, 722, and weights 714, 724 respectively. The weight processing components 712, 722, 714, 724 are the trained neural networks used by the head or multi-head attention processing within each subsystem 710, 720.

In this embodiment of the prompt attention-processing subsystem 720, a prompt weight processor component 722 and associated weight memory 724 are incorporated into the subsystem. These weights 724 can be initialized from the generation processing subsystem weights 714 or by an off-subsystem storage device including but not limited to a server or general-purpose computer. In the shown embodiment, the Token Generation Subsystem & Trained weights Storage subsystem 730 provides the weights to be loaded into the prompt and processing attention-processing subsystems 710, 720. Regardless of how the weights 714, 724 are initialized, they need to be the same for each of the one or more heads in both the generation attention-processing subsystem 710 and the prompt attention-processing subsystem 720.

The prompt attention-processing subsystem 720 can receive one or more user prompts 716 or tokens, token sequences, or token segments 732 from a token generation subsystem 730. The token generation subsystem 730 can be a server or general-purpose processor that converts a user prompt 716 into a token, a token sequence, or token segments 732. If the prompt attention-processing subsystem 720 receives the user prompt 716, the prompt attention-processor will convert the prompt 716 into a token sequence.

The prompt tokens are processed by a prompt self-attention processor 726. The prompt self-attention processor 726 can be multiple special-purpose processors, including but not limited to an NPU, GPU, MPU, or a number of processors within a matrix of processors. The arrangement of the processors for the prompt self-attention processor 726 and prompt weight processor 722 can be as described above for FIGS. 5A, 5B, and 5C.

The prompt attention-processing subsystem 720 can utilize slower and less costly prompt KV-cache 727 utilizing DDR memory or could run on faster high bandwidth memory (HBM). In another embodiment, a combination of DDR and HBM memory can be used by the prompt attention-processing subsystem 720.

Upon completion of processing a token stream or a token segment 732 by the prompt attention-processing subsystem 720, the generated values in the prompt KV-cache 727 are transferred to the generation attention-processing subsystem 710. The generation attention-processing subsystem 710 is comprised of generation self-attention processors 706 configured to perform generation attention-processing, and the generation KV-cache 704. The generation KV-cache 704 can be HBM memory to support the high memory demand for updating the cache. However, other memory types are contemplated. The generation self-attention processors 706 can take the form as described above in FIGS. 5A, 5B, and 5C.

Upon the completion of the processing of the prompt tokens, the data values generated during the token processing are transferred to the generation KV-cache 714 from the prompt KV-cache 727. The transfer of the data between the prompt KV-cache 727 and the generation KV-cache 714 can occur over a dedicated or shared bus 702.

Upon receiving the data from the prompt KV cache, the data is processed by the generation attention-processing subsystem 720 generating an output sequence of tokens 718.

FIG. 8 shows a flowchart of the method 800 for processing a prompt in an LLM system that incorporates prompt attention-processing and generation attention-processing. The method of implementing an LLM comprises processing an input prompt.

In step 810, the prompt is processed into a plurality of tokens or a sequence of tokens. The processing of a prompt into a plurality of tokens can be performed by the prompt attention-processing subsystem or can be performed by a general-purpose CPU outside of the prompt attention-processing subsystem.

In an optional step 820, the sequence of tokens is divided into segments. Segmentation may be needed because of resource constraints within the prompt attention-processing system. The resource constraints can include KV-cache memory. Further, the token segment size may be selected to match the hardware's parallel processing capabilities. In one embodiment, one hundred twenty-eight tokens are processed in parallel by the token attention processing system.

In step 830, the prompt, comprising a plurality of tokens, or segments of multiple tokens are processed by a prompt attention-processing subsystem. The attention-processing subsystem can be comprised of arrays of NPUs and GPUs, and HBM memory and DDR memory coupled to the arrays of NPUs and GPUs through dedicated buses. The prompt attention-processing results in the generation of a KV matrix and thereby populates the prompt KV-cache with values associated with the prompt attention-processing of the tokens from the prompt.

Upon completion of attention-processing the tokens, the prompt KV-cache is transferred into the generation KV-cache of a generation attention-processing subsystem at step 840. The generation attention-processing subsystem then generates an output sequence based on the transferred KV-cache values at step 850.

The prompt attention-processing subsystem and the generation attention-processing subsystem includes at least one head. A head is also referred to as an attention head or an language model (LM) head. The head is a neural network that is trained for a neural model to attend to various aspects of "subspaces" of the input sequence concurrently, thereby enriching the models understanding of the data. Often, LLMs' attention-processing subsystem employs multi-head attention, where self-attention is performed simultaneously with different learned attention weights. Each "head" operates independently and has its own set of query (Q), key (K), and value (V) weight matrices. For example, GPT-3 has 96 layers with 96 attention heads each, performing 9,216 attention operations each time it predicts a new word.

In another embodiment of the method of implementing an LLM with a prompt attention-processing subsystem, the prompt can have too many tokens for processing by the prompt attention-processing subsystem. Accordingly, the prompt, which is represented by a plurality of tokens, is broken into token segments. Upon the completion of processing a token segment by the prompt attention-processing subsystem, the prompt segment KV-cache is transferred over to the generation KV-cache. Because many processing systems provide parallel processing, in one embodiment, the token segment is processed in parallel. For example, one hundred and twenty-eight tokens could be processed in parallel.

The memory used for the prompt KV-cache and generation KV-cache can be accessed by different processors on the prompt attention-processing subsystem and the generation attention-processing subsystem. Having a separate memory bus for the prompt and generation KV-cache provides faster subsystem speed; therefore, the LLM system can be implemented with a separate memory bus for the prompt KV-cache and the generation KV-cache. The prompt and generation KV-cache can be implemented with the same or different types of memory, including HBM and DDR memory.

The corresponding structures, materials, acts, and equivalents of all means or step plus function elements in the claims below are intended to include any structure, material, or act for performing the function in combination with other claimed elements as specifically claimed. The description of the present technology has been presented for the purposes of illustration and description but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application and to enable others of ordinary skill in the art to understand the present technology for various embodiments with various modifications as are suited to the particular use contemplated.

Aspects of the present technology are described above with reference to flowchart illustrations and/or block diagrams of methods and apparatus (systems) according to embodiments of the present technology.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or combinations of special purpose hardware.

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment," "in an embodiment," or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms, and a plural term may include its singular form. Similarly, a hyphenated term (e.g., "on-demand") may occasionally be interchangeably used with its non-hyphenated version (e.g., "on-demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments, the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," "an," and "the" are intended to include the plural forms as well unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purposes only and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for implementing a neural large language model comprising:

processing a plurality of tokens by a prompt attention-processing subsystem comprising a first plurality of hardware processors and a first memory storing a prompt KV-cache, thereby populating the prompt KV-cache with values associated with the token processing by the prompt attention-processing subsystem;

transferring the prompt KV-cache into a generation KV-cache of a generation attention-processing subsystem upon completion of the prompt attention-processing by the prompt attention-processing subsystem; and generating by the generation attention-processing subsystem an output sequence based on the transferred KV-cache, wherein the generation attention-processing subsystem comprises a second plurality of hardware processors and a second memory storing the generation KV-cache, the second memory being separate and distinct from the first memory; and wherein the prompt attention-processing subsystem and the generation attention-processing subsystem are architecturally distinct hardware subsystems, each implemented with dedicated hardware processors and memory resources.

2. The method of claim 1, further comprising encoding a prompt into the plurality of tokens.

3. The method of claim 1, wherein the prompt attention-processing subsystem and the generation attention-processing subsystem are multi-headed, thereby providing multi-headed neural processing as part of the prompt attention-processing subsystem and the generation attention-processing subsystem.

4. The method of claim 3, wherein the multi-headed prompt attention processing subsystem and the multi-headed generation processing subsystem use the same weight values for the multi-headed neural processing.

5. The method of claim 2, further comprising:

segmenting the prompt into a plurality of token segments, wherein each token segment is processed by the prompt attention-processing subsystem thereby generating prompt segment KV-cache values, stored in the prompt KV-cache, for each of the plurality of token segments, and wherein the prompt segment KV-cache values, for each token segment, are transferred to the generation KV-cache upon completion of the processing of each of the plurality of token segments by the prompt attention-processing subsystem.

6. The method of claim 5, wherein each token within a token segment is processed in parallel by the prompt attention-processing subsystem.

7. The method of claim 6, wherein one hundred and twenty-eight tokens are processed in parallel.

8. The method of claim 1, wherein the first memory and the second memory are each separate memories accessed over separate and dedicated memory buses.

9. The method of claim 8, wherein the first memory is high bandwidth memory (HBM).

10. A system for attention based neural large language model processing with a prompt attention-processing, the system comprising:

a prompt attention-processing subsystem comprising:

a prompt KV-cache memory;

prompt self-attention processors comprising a plurality of prompt special-purpose-processors, said prompt special-purpose-processors configured to execute instructions stored in a program memory configured to perform a method of prompt attention-processing, the method of prompt attention-processing comprising:

process a plurality of tokens, thereby populating the prompt KV-cache memory with KV-cache values associated with the prompt attention-processing of the plurality of tokens; and transfer the prompt KV-cache values into a generation KV-cache upon completion of the prompt attention-processing; and a generation attention-processing subsystem comprising:

a generation KV-cache memory; and generation self-attention processors comprising a plurality of generation special-purpose-processors, said generation special-purpose-processors configured to execute instructions stored in a program memory configured to perform a method of generation attention-processing, the method of generating attention-processing comprising:

generate upon receiving the prompt KV-cache values a token output sequence based on the transferred KV-cache values.

11. The system of claim 10, wherein the method of prompt attention-processing further comprises encoding a prompt into the plurality of tokens.

12. The system of claim 10, further comprising:

a general-purpose processor, wherein the general-purpose processor encodes a prompt into the plurality of tokens and transfers the plurality of tokens to the prompt attention-processing subsystem.

13. The system of claim 10, wherein the prompt attention-processing subsystem and the generation attention-processing subsystem are multi-headed.

14. The system of claim 10, the method of prompt attention-processing further comprises:

segmenting the plurality of tokens into one or more token segments, wherein each token segment is processed by the prompt attention-processing subsystem thereby generating prompt segment KV-cache values for each of the one or more token segments, and wherein for each of the prompt segment KV-cache values, the prompt segment KV-cache values are transferred into the generation KV-cache upon completion of the prompt segment processing subsystem.

15. The system of claim 14, wherein the plurality of prompt special-purpose-processors are configured to process each token segment in parallel.

16. The system of claim 15, wherein one hundred and twenty-eight tokens are processed in parallel by the prompt attention-processing subsystem.

17. The system of claim 10, wherein the prompt KV-cache and generation KV-cache are separate memories and are accessed over separate memory buses by at least one of the plurality of prompt special-purpose-processors and at least one of the plurality of generation special-purpose-processors.

18. The system of claim 17, wherein the prompt KV-cache memory is high bandwidth memory.

19. The system of claim 10, wherein the same memory weights are used for the prompt attention-processing and the generation attention-processing.

20. The system of claim 10, wherein the prompt attention-processing subsystem and the generation attention-processing subsystem each include weight processing processors.

* * * * *